June 11, 1968     L. G. FITZ-GERALD     3,387,343
PIPE-CLIP ARRANGEMENT
Filed April 28, 1967     2 Sheets-Sheet 1
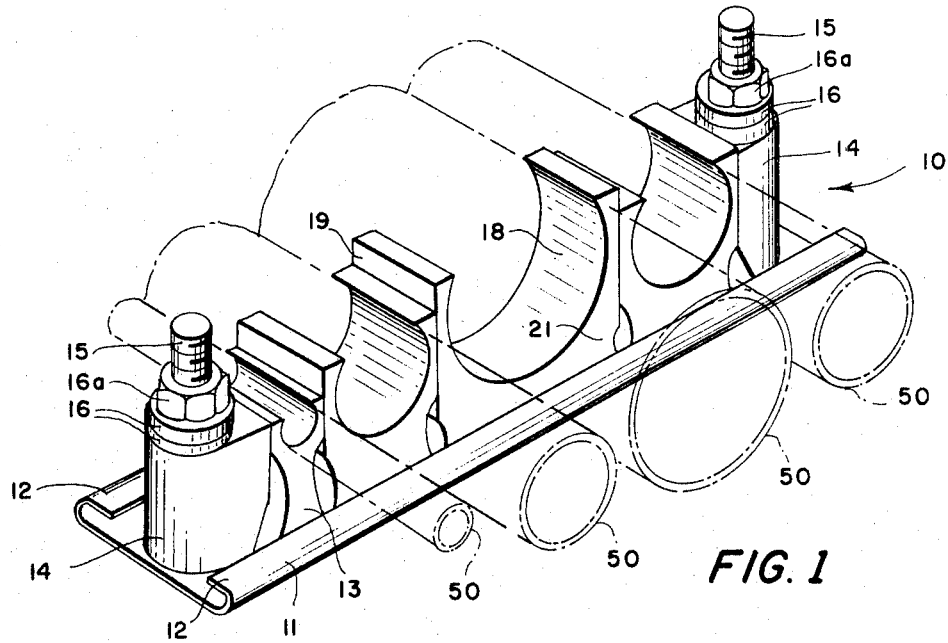
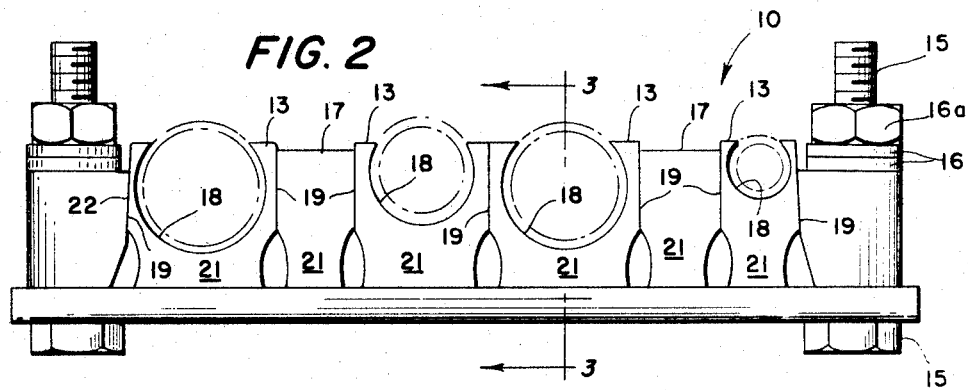
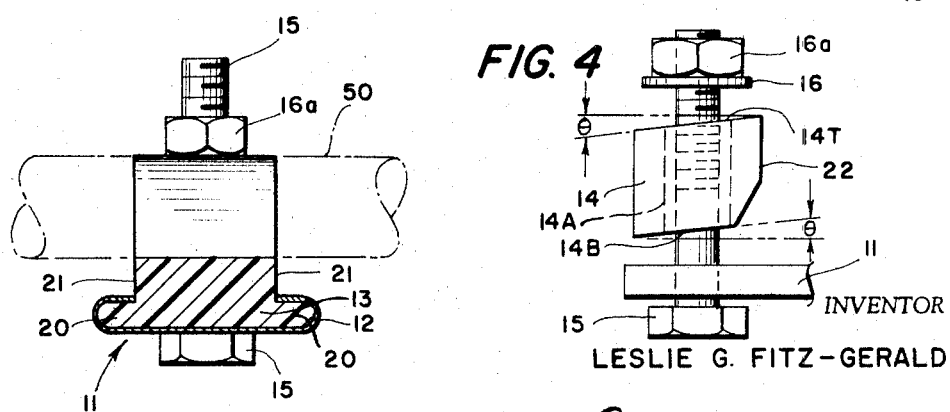
INVENTOR
LESLIE G. FITZ-GERALD
BY Larson and Taylor
ATTORNEYS

INVENTOR
LESLIE G. FITZ-GERALD

BY *Larson and Taylor*

ATTORNEYS

United States Patent Office 3,387,343
Patented June 11, 1968

3,387,343
PIPE-CLIP ARRANGEMENT
Leslie G. Fitz-Gerald, Yeovil, England, assignor to Westland Aircraft, Limited
Filed Apr. 28, 1967, Ser. No. 634,710
Claims priority, application Great Britain, Nov. 9, 1966, 50,313/66
18 Claims. (Cl. 24—81)

ABSTRACT OF THE DISCLOSURE

An arrangement for simultaneously securing a plurality of generally parallel pipes, cables or the like including an elongated base member extending transversely across the pipes and a plurality of individual pipe retaining elements, one for each pipe, mounted on the base member between a pair of clamps. The pipe retaining elements receive the pipes in arcuate portions thereof, and trap the pipes therein when the clamps are manipulated to push all of the pipe retaining elements together.

BACKGROUND

Field of the invention

This invention relates to pipe-clips, and in particular, to a pipe-clip arrangement designed to retain and support a bank of pipes, conduits, cables and the like. For convenience, these various types of elongated members, pipes, cables, conduits, etc., will be referred to hereinafter generically as "pipes."

Description of the prior art

Elongated pipes must be firmly secured, at various points throughout their length, to suitable fixed structural members for retaining the pipes in place. A known type of retaining means includes a pair of matching blocks, each having a semi-cylindrical recess, and includes a means for clamping the blocks together and attaching the retaining means to a suitable fixed structural member. Often it is necessary to retain a group of generally parallel, closely spaced pipes. Such an arrangement will be referred to hereinafter as a "bank" of pipes. One known procedure for firmly securing the pipes of a bank has been to employ the procedure used for retaining individual pipes. This would be accomplished by forming each of the matched pair of blocks with a plurality of semi-cylindrical recesses, one for each pipe of the bank.

One variant on this basic form of pipe-clip comprises a base strip including a plurality of crutch-pieces attached thereto, each crutch piece serving to cradle a given pipe. However, this arrangement can be used only where all of the pipes have the same overall diameter since the pipes are retained in the crutch pieces by a beam which extends transversely across above the bank holding the individual pipes cradled in the crutch pieces. The beam is held onto the crutch pieces with suitable rubber stripping, bonding or retaining bolts.

These previously known pipe-clip arrangements for a bank of pipes have many important disadvantages. First, the individually machined matched blocks are quite expensive. The base strip and crutch piece arrangement has the disadvantage that the beam can be used effectively only when all pipes are of the same size. If the beam is not employed, then the crutch pieces merely cradle the pipes without actually retaining them in position. Moreover, all known pipe-clips require many components to grip the pipes and they make no allowance for pipe expansion and contraction.

SUMMARY OF THE INVENTION

The purpose of the present invention is to provide a pipe-clip arrangement for a bank of pipes or the like, which arrangement is more economical, more efficient and easier to apply than previously known pipe-clips.

According to the present invention there is provided an elongated base member designed to extend transversely across a bank of pipes, and a plurality of individual pipe retaining elements engageable in the base and movable therealong in the direction transverse to the bank of pipes. Each pipe retaining element is formed of a resilient material such as plastic or the like and includes an arcuate, partially cylindrical recess for receiving an individual pipe.

A clamping element is provided at each end of the transversely extending base member, the clamping elements being designed to apply a limited compressive force to the pipe retaining elements disposed therebetween, thereby trapping the pipes within the pipe retaining elements.

In a preferred embodiment of the invention the clamps are designed to move inwardly a slight, predetermined distance to apply only a limited compressive force to the elements. Therefore, if the full space between the clamps is not taken up by pipe retaining elements which can be pushed against each other, then any additional spaces must be filled by suitable spacing blocks. If a pipe is removed then its pipe retaining element must be replaced by a solid dummy element to assure that the compressive force is transmitted throughout the distance between the clamping elements. Moreover, to further assist transmission of the force between the clamping elements, each pipe retaining element, dummy element and spacer element includes a vertical plane surface on each of its sides positioned to abut a corresponding vertical plane surface on each adjacent element.

Within the basic concept of the present invention numerous modifications are possible. For example, the height of the individual pipe retaining elements may be arranged so that the centerline of all pipes in the bank lie in a common plane. Alternatively, the pipe retaining elements may be arranged so that the uppermost point on each pipe in a bank lies in a common plane. Moreover, any suitable means may be employed for mounting the pipe-clip arrangement to a suitable structural member. For example, a mounting post may be included intermediate between the two clamping elements. Also, a plurality of clips may be arranged one above the other for retaining parallel, multiple rows of pipe banks.

Thus, it is an object of this invention to provide a new improved pipe-clip arrangement for a bank of pipes which overcomes the disadvantages of previously known pipe-clip arrangements.

It is another object of this invention to provide a pipe-clip structure which is more economical and which secures the pipes in a manner far more efficient than pipe-clips known heretofore.

It is still another object of this invention to provide a pipe-clip for a bank of pipes including a base member extending transversely across a bank of pipes and including a plurality of individual resilient pipe retaining elements for retaining the pipes and to which a limited compressive force is applied by suitable clamping means.

It is still another object of this invention to provide a pipe-clip arrangement which is readily adaptable for use with any combination of pipe sizes required.

Other objects and the attendant advantages of the present invention will become apparent from the detailed description to follow together with the accompanying drawings.

BRIEF DESCRIPTION OF THE DRAWINGS

It is to be understood that the detailed description to follow, together with the accompanying drawings, are intended only to illustrate a preferred embodiment of the invention, and that the invention is capable of numerous modifications and variations apparent to one skilled in the art without departing from the spirit and scope of the invention as defined in the claims.

In the drawings:

FIGURE 1 is a perspective view of one embodiment of a pipe-clip arrangement according to the present invention with the pipes shown in phantom lines.

FIGURE 2 is a front elevation of the embodiment shown in FIGURE 1 but including a different set of pipe retaining elements than is shown in FIGURE 1.

FIGURE 3 is a sectional view taken along line 3—3 of FIGURE 2.

FIGURE 4 is an expanded view of the clamping elements shown in FIGURES 1 and 2.

DESCRIPTION OF THE PREFERRED EMBODIMENTS

Figure 5:
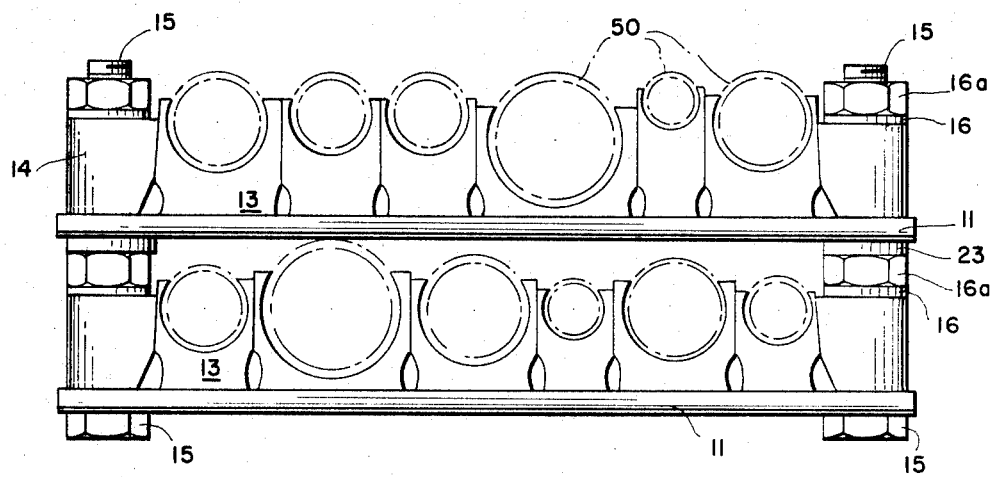
FIGURE 5 is a front elevation showing the application of the invention to multiple bank assembly wherein the upper pipe-clip assemblage illustrates another embodiment of the present invention.

In describing the structure and operation of the invention terms such as "horizontal," "vertical," "left," "right," "upper," "lower," "clockwise," "counterclockwise," etc., will be employed for purposes of convenience to describe the orientation of the elements as shown in the drawings. However, it is to be understood that the invention is capable of assuming any position or orientation in practice.

Referring now to the drawings, and in particular to FIGURES 1–4 there is shown a pipe-clip arrangement 10 including a base member 11 of metal or any other stiff material extending transversely across a bank of pipes. The sides of the base member 11 are turned inwardly to form a pair of runners or tracks 12. Individual pipe retaining elements 13 are mounted on the base member 11 between clamping elements 14.

One advantage of the invention is that the size, shape and number of pipe retaining elements between the clamping members 14 may be selected as required to fit onto the pipes of any given bank.

The individual pipe retaining elements 13 are formed of a suitable strong, but resilient, material such as plastic formed by suitable plastic molding procedure. The elements include an arcuately shaped channel formed by a bottom portion and two side portions and open at the top and extending over an arc of approximately 240°. The upper edges of the side portions from the entry into the channel are chamfered to facilitate insertion of a pipe. The left and right sides of the element 13 include a vertical abutment surface 19 arcuately relieved in the region below the clip portion 18. It will be noted that regardless of the size or shape of the element 13, a portion of its abutment surface 19 will be at such a height that it will abut against a similar portion of an abutment surface 19 of any other retaining element 13. The interior of the arcuate portion 18 may include a nickel plating to assure electrical bonding.

As best illustrated in FIGURE 3, a pair of flanges 20 extend outwardly from the free sides 21 of the pipe retaining element 13 into the tracks formed by inwardly curved edges 12 of the base 11.

At each end of the base member 11 there is provided a clamping element 14 which is held onto the base member 11 by a bolt 15, washers 16 and a nut 16a. A clamping element is shown in greater detail in the expanded view of FIGURE 4. In the untightened state the clamping element 14 includes a flat vertical surface 22. The upper and lower surfaces 14T and 14B of element 14 are parallel and are inclined upwardly towards the center of the pipe-clip arrangement at an angle indicated generally as $\theta$. The bolt 15 passes through an enlarged aperture 14A, the axis of which is vertical when the bolt is in the untightened state. When the surface 14B is pressed against base 11 and the washer 16 and nut 16a against surface 14T, the clamping unit will turn slightly in the clockwise direction so that the surface 22 will move clockwise into the elements 13 thereby applying a limited compressive force to the elements 13. The purpose of this operative procedure will be explained in greater detail below.

Figure 6:
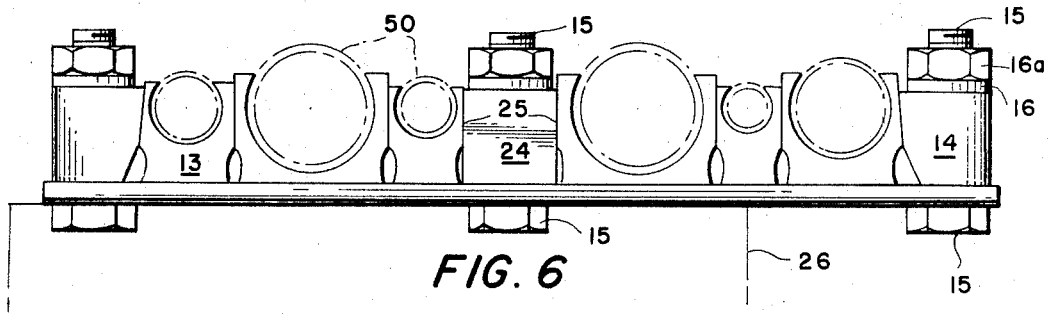
FIGURE 6 is a front elevation of a further embodiment of the invention with an intermediate post.
Figure 7:
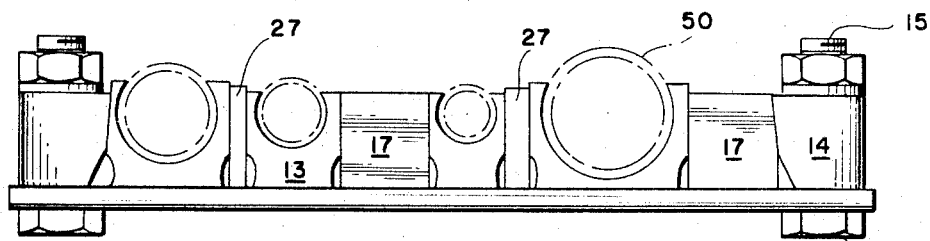
FIGURE 7 is a front elevation of a further embodiment of the invention employing spacers and dummy pipe retaining elements.

FIGURES 5–7 illustrate various forms and arrangements of the invention in practice. FIGURE 5 illustrates how the pipe-clip arrangement may be applied to a multiple bank of pipes. As shown in FIGURE 5 a single elongated bolt element 15 extends upwardly from the bottom of the lowermost pipe-clip arrangement to a distance above the upper pipe-clip arrangement. A suitable spacing means 23 of any desired thickness may be provided above the nut 16a to provide a suitable spacing between various levels of the multiple bank. For example, by employing a longer bolt 15 and further spacing elements 23, the present invention can be used with two, three, four or any number of parallel banks.

FIGURE 5 also illustrates how the present invention can be easily and readily adapted for use with pipes of any given size. For example, it will be noted that the pipes in the upper bank of FIGURE 5 are of a different size than those of the lower bank. Also, it will be noted that the pipes 50 in the upper bank have their centerlines lying in different planes but all of the pipes extend upwardly to a common height. However, the pipes in the lower bank extend upwardly to different heights but their centerlines all lie on a common plane. It is a simple matter to design a given pipe retaining element 13 for a pipe 50 of any given size and to retain a pipe 50 at any given height above the base 11.

FIGURE 6 illustrates the use of an intermediate post 24. This post serves at least two purposes. First, it may be employed for holding the track 11 to a structure 26 wherein part of the pipe-clip extends over the edge of the structure. Also, an intermediate post may be desired whenever the pipe-clip extends for a particularly large distance. This post 24 would include vertical right and left sides 25 for engagement with the vertical abutment surfaces 19 of the elements 13.

As will become more evident below, it is necessary that no gaps remain between the two clamping elements 14. Thus, if the clamping arrangement is to be applied to a bank of pipes having spaces between the pipes or wherein a given pipe has been removed, the spaces may be filled as shown in FIGURE 7. Elements 17 represent "dummy" retainer elements and are designed to replace a pipe retaining element 13 when a given pipe has been removed from a bank. Smaller spacing elements 27 are designed to fill gaps between retaining elements 13, where said gaps are present in a full bank of pipes.

The operation of the invention is as follows. First, a suitable base member 11 is selected which will extend transversely across the bank of pipes to be secured and will allow sufficient room at its end for the pipe-clip clamping structure. Suitable pipe retaining elements 13 are then chosen to fit onto the pipes of the bank. If necessary, spacing element 27 or dummy retaining elements 17 are also selected. The elements are then slid onto the base from one end thereof with the flanges 20 engaged in tracks 12. With the elements 13 (and if necessary, 17 and/or 27) in place, bolts 15 are inserted through the base 11 and clamping elements 14, washers 16 and nuts 16a are placed onto the bolts 15. At this stage, each element 14 is mounted loosely on its bolt 15 with its side 22 in a vertical position resting against the abutment surface 19 of the adjacent element 13, the surfaces 14T and 14B still inclined at an angle θ with the lowermost portion of 14B resting on base 11, the washer 16 resting loosely on surface 14T and nut 16a in the raised position as shown in FIGURE 4. With the elements so arranged the pipes are pressed into their appropriate retaining elements 13 through the entrance provided at the upper portion thereof into the arcuate portion 18. When all of the pipes in the bank have been pressed into place the nuts 16a are tightened down onto their respective surfaces 14T. As the nuts 16a are so tightened, the clamping elements 14 will tend to reduce the angle θ so that surfaces 22 turn inwardly to apply a compressive force to the abutment surfaces 19 of the adjacent retaining elements 13. Since a complete line of contact exists all the way from one clamping element 14 to the other clamping element 14 through abutment faces 19, then this slight compressive force will be sufficient to trap all of the pipes 50 in their respective retaining elements 13 since the upper portions of the elements 13 will be unable to expand as they could to allow entry of the pipe elements.

However, this slight comprehensive force does not cause the clips to grip the pipes so firmly as to prohibit all axial sliding of the pipes within arcuate portions 18. Therefore, the pipes are allowed to slide axially. This allows for thermal expansion and contraction of the pipes.

Although the invention has been described in considerable detail with respect to certain preferred embodiments thereof, it should be apparent that the invention is capable of numerous modifications and variations apparent to those skilled in the art without departing from the spirit and scope of the invention. For example, electrical bonding may be provided by means of metal inserts disposed within the plastic moldings rather than by the metal plating of the arcuate portions 18. Also, while the invention has been described with respect to pipes and the like, it should be understood that the invention can be applied also for the retention of flexible pipe lines and electrical cables as well as rigid pipes and conduits since the arrangement is such that only a very limited pressure is applied by the retaining elements to the items of the bank being retained. Further, while a certain type of clamping element is shown, it should be apparent that other types of clamping elements could be employed for holding the pipe retaining elements in place and applying the limited compressive force thereto.

I claim:

1. A device for securing a plurality of generally parallel pipes comprising, a base member adapted to extend transversely across the pipes, a plurality of individual pipe retaining elements mounted across said base, each element having a channel for supporting a pipe running generally transversely to the said base, each element being of a resilient material and comprising a bottom portion and two upstanding side portions, the inside surfaces of the side portions forming, with the bottom portion, the said channel, the dimensions of the channel cross-section being approximately equal to the cross-section of the said pipe, and the distance separating the upper ends of the side portions in the unstressed state being less than the greatest dimension of the said pipe so that the said upper ends must be resiliently urged apart to allow passage of the pipe by the said upper ends and into the channel, means for substantially retaining said elements from movement transversely of said base, and clamping means on said base for applying a limited compressive force to said elements in a direction generally transverse to the pipes to trap the pipes located in the pipe retaining elements so as to prevent resilient separation of said upper ends and thereby prevent removal of said pipe through the space between the upper ends.

2. A device as claimed in claim 1 wherein said element includes a plane surface on each side of the pipe retaining element wherein all the pipe retaining elements have at least a portion of each of their plane sides intersecting a common straight line running generally parallel to the base between the clamping means.

3. A device as claimed in claim 2 wherein said clamping means includes a clamping member mounted at each end of the base for vertical movement and having a vertical clamping surface facing the elements and having upper and lower surfaces inclined relative to the base, whereby the application of a downward force to said clamp elements causes the said vertical surface to exert a force on the plane side of the adjacent pipe retaining element and thereby act through all of the plane surfaces to urge the pipe retaining elements together thereby exerting the said limited compressive force.

4. A device as claimed in claim 1 where the said elements are formed of a plastic material.

5. A device as claimed in claim 1 wherein the surface of the channels includes a metallic coating.

6. A device as claimed in claim 1 wherein the said elements are arranged on the base so that the centers of the pipes supported by the device all lie in a common plane.

7. A device as claimed in claim 1 where said elements are arranged on the base so that the points on the circumference of the pipes farthest from the base all lie in a common plane.

8. A device as claimed in claim 1 wherein said pipe retaining elements are mounted on said base for sliding movement longitudinally of said base between said clamping means.

9. A device as claimed in claim 1 wherein said device includes, in addition to said pipe retaining elements, at least one spacing member to fill a gap between the clamping means not filled by pipe retaining elements.

10. A device as claimed in claim 1 including two said base members each having said pipe retaining elements, said means for restraining and clamping means associated therewith, and each base member adapted to extend transversely across a separate bank of pipes, and including means for rigidly connecting two base members together.

11. A device as claimed in claim 1 including at least one intermediate post stationarily mounted on said base between said clamping means.

12. A device as claimed in claim 1 wherein the said channel is an arcuate portion extending for approximately 240°.

13. A device as claimed in claim 1 wherein each said pipe retaining element includes a plane surface on each side thereof, wherein all of the elements have at least a portion of their plane sides intersecting a common straight line running parallel to the base between clamping means.

14. A device as claimed in claim 22 wherein each said clamping element includes a clamping member mounted at each end of the base for vertical movement and having a vertical clamping surface facing the elements and having upper and lower surfaces inclined relative to the base, whereby the application of a downward force on said clamp elements causes the said vertical surface to exert a force on the plane side of the adjacent pipe retaining elements and thereby act through all of the plane surfaces to urge the pipe retaining elements together thereby exerting the said limited compressive force.

15. A device as claimed in claim 11 wherein said clamping elements include threaded means for mounting said clamping elements on the base and for urging the clamping elements downwardly to cause the compressive force to be exerted on the pipe retaining elements.

16. A device as claimed in claim 1 wherein the said pipe retaining element is coated with a metallic material.

17. A device for securing a plurality of generally parallel pipes comprising, a base member adapted to extend transversely across the pipes, a plurality of individual pipe retaining elements mounted across said base, each element adapted to support a pipe running generally transversely to the said base, means for substantially retaining said elements from movement transversely of said base, and clamping means on said base for applying a limited compressive force to the said elements in a direction generally transverse to the pipes to trap the pipes located in the pipe retaining elements, and wherein said clamping means includes a clamping member mounted at each end of the base for vertical movement and having a vertical clamping surface facing the elements and having upper and lower surfaces inclined relative to the base, whereby the application of a downward force on said clamp elements causes each said vertical surface to exert a force on the plane side of the adjacent pipe retaining element and thereby act through all of the plane surfaces to urge the pipe retaining elements together thereby exerting the said limited compressive force.

18. A device as claimed in claim 17 wherein said clamping elements include threaded means for mounting said clamping elements on the base and for urging the clamping elements downwardly to cause the compressive force to be exerted on the pipe retaining elements.

References Cited

UNITED STATES PATENTS

| | | | |
|---|---|---|---|
| 1,054,063 | 2/1913 | Warren | 24—81.35 |
| 1,200,474 | 10/1916 | Dunlap | 248—49 |
| 2,288,158 | 6/1942 | Ellinwood | 248—67.5 XR |
| 2,353,443 | 7/1944 | Carpenter et al. | 248—68 |
| 2,625,861 | 1/1953 | Swanson. | |
| 3,087,009 | 4/1963 | Blanchet | 248—68 XR |
| 3,329,278 | 7/1967 | Pachmayr | 248—68 XR |

FOREIGN PATENTS

| | | |
|---|---|---|
| 975,405 | 10/1950 | France. |
| 1,014,448 | 12/1965 | Great Britain. |
| 153,737 | 1/1964 | U.S.S.R. |

DONALD A. GRIFFIN, *Primary Examiner.*